(12) United States Patent
Battocchio et al.

(10) Patent No.: US 8,672,003 B2
(45) Date of Patent: Mar. 18, 2014

(54) TYRE AND FLEXIBLE MEMBER ASSEMBLY

(75) Inventors: Claudio Battocchio, Riom (FR); Bernard Cubizolle, Cebazat (FR)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 64 days.

(21) Appl. No.: 12/738,334

(22) PCT Filed: Oct. 23, 2008

(86) PCT No.: PCT/FR2008/051916
§ 371 (c)(1),
(2), (4) Date: Jun. 29, 2010

(87) PCT Pub. No.: WO2009/056741
PCT Pub. Date: May 7, 2009

(65) Prior Publication Data
US 2010/0276043 A1    Nov. 4, 2010

(30) Foreign Application Priority Data
Oct. 23, 2007  (FR) ...................................... 07 58519

(51) Int. Cl.
*B60C 19/00*    (2006.01)
*B60C 23/00*    (2006.01)

(52) U.S. Cl.
USPC ........................................ 152/152.1; 152/450

(58) Field of Classification Search
USPC .............................................. 152/152.1, 450
See application file for complete search history.

(56) References Cited

U.S. PATENT DOCUMENTS

| 2,710,623 | A | | 6/1955 | Kolos |
| 3,034,558 | A | | 5/1962 | Steer et al. |
| 3,468,359 | A | | 9/1969 | Rutledge ........................ 152/367 |
| 4,540,035 | A | | 9/1985 | Roberts ........................ 152/367 |
| 5,562,787 | A | | 10/1996 | Koch et al. ........................ 156/64 |
| 5,971,046 | A | * | 10/1999 | Koch et al. ................. 152/152.1 |
| 6,462,650 | B1 | | 10/2002 | Balzer et al. ................... 340/442 |
| 6,788,192 | B2 | | 9/2004 | Shimura ........................ 340/447 |
| 6,885,291 | B1 | | 4/2005 | Pollack ........................ 340/445 |
| 2002/0174925 | A1 | | 11/2002 | Wilson et al. ................... 152/415 |
| 2004/0094251 | A1 | | 5/2004 | Strache et al. .............. 152/152.1 |
| 2005/0044943 | A1 | * | 3/2005 | Godeau et al. ................... 73/146 |
| 2005/0076982 | A1 | | 4/2005 | Metcalf et al. .............. 152/152.1 |
| 2005/0126668 | A1 | | 6/2005 | Fornerod et al. ............ 152/152.1 |
| 2006/0016534 | A1 | * | 1/2006 | Peyron et al. ............... 152/152.1 |
| 2006/0164250 | A1 | | 7/2006 | Kawai ........................ 340/572.8 |
| 2006/0237109 | A1 | * | 10/2006 | Mangold et al. ........... 152/152.1 |
| 2007/0175554 | A1 | | 8/2007 | Bertrand .................... 152/152.1 |

(Continued)

FOREIGN PATENT DOCUMENTS

| DE | 10 2006 004707 A1 | 9/2006 |
| DE | 10 2007 030232 A1 | 1/2009 |

(Continued)

*Primary Examiner* — Justin Fischer
*Assistant Examiner* — Robert Dye
(74) *Attorney, Agent, or Firm* — Fitzpatrick, Cella, Harper & Scinto

(57) ABSTRACT

An assembly of a tyre and a member fitted to the tyre respectively include complementary connecting portions. The connecting portion of the member is more flexible than that of the connecting portion of the tyre.

16 Claims, 3 Drawing Sheets

(56) References Cited

U.S. PATENT DOCUMENTS

| | | |
|---|---|---|
| 2008/0251173 A1 | 10/2008 | Cubizolle ............... 152/152.1 |
| 2010/0230024 A1 | 9/2010 | Borot et al. ............... 152/450 |
| 2010/0276048 A1 | 11/2010 | Adamson et al. ........... 152/450 |
| 2010/0276563 A1 | 11/2010 | Cubizolle et al. .......... 248/633 |
| 2010/0291345 A1 | 11/2010 | Cubizolle et al. .......... 428/138 |
| 2011/0226401 A1 | 9/2011 | Battocchio et al. ......... 152/548 |

FOREIGN PATENT DOCUMENTS

| | | |
|---|---|---|
| EP | 0 389 406 A2 | 9/1990 |
| EP | 1 544 001 A1 | 6/2005 |
| EP | 1 970 222 A1 | 9/2008 |
| JP | 11-042915 A | 2/1999 |
| JP | 2004-291855 A | 10/2004 |
| JP | 2005-096423 A | 4/2005 |
| JP | 2005-178761 A | 7/2005 |
| JP | 2005-271695 A | 10/2005 |
| JP | 2006-021611 A | 1/2006 |
| JP | 2006-507495 A | 3/2006 |
| JP | 2007-182142 A | 7/2007 |
| WO | WO 99/29523 A1 | 6/1999 |
| WO | WO 2004/016454 A1 | 2/2004 |
| WO | WO 2004/048132 A1 | 6/2004 |
| WO | WO 2005/082644 A1 | 9/2005 |
| WO | WO 2006/128529 A1 | 12/2006 |
| WO | WO2007/000781 * | 1/2007 |

* cited by examiner

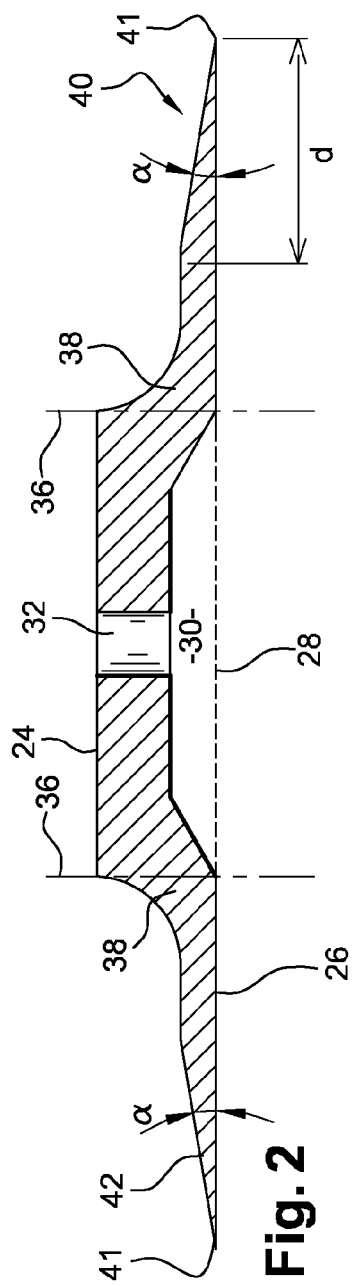
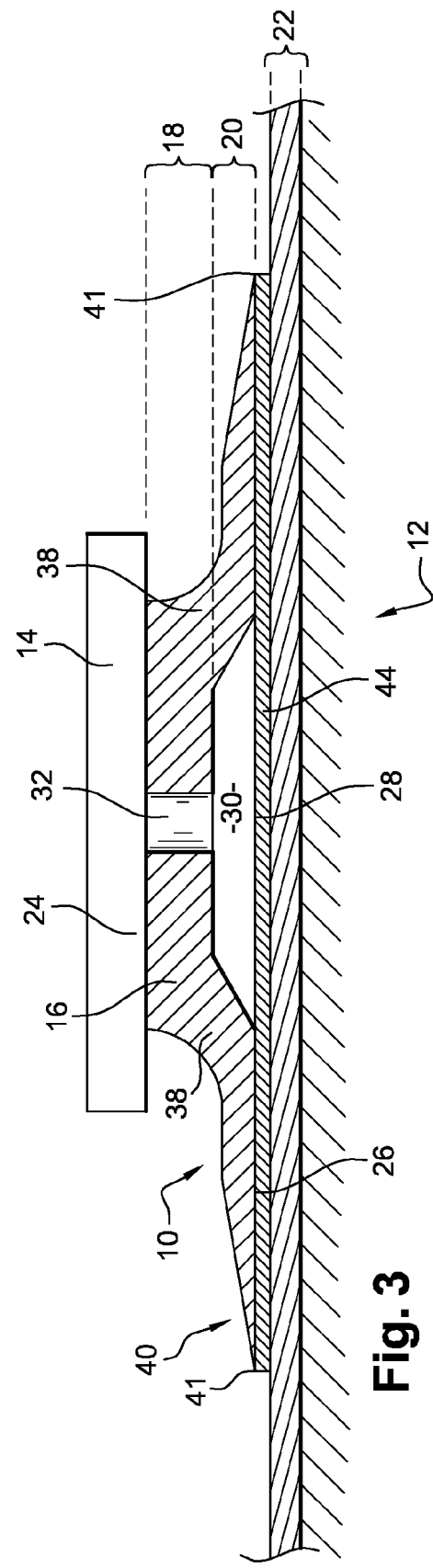

TYRE AND FLEXIBLE MEMBER ASSEMBLY

The present invention relates to the technical field of tyres for motor vehicles.

In the prior art, notably according to document EP-A1-1 544 001, a member made of rubber is known that is bonded to the inner surface of a tyre and forms a support for an electronic device such as a pressure sensor or temperature sensor. The member made of rubber is sometimes called a "patch".

During its use, the tyre sustains accelerations and deformations which weaken the attachment of the member to the tyre. Therefore, a partial, or even total, peeling of the member is generally found at the end of the life of the tyre.

The object of the invention is notably to prevent or delay the appearance of this peeling and to improve the grip of the member on the tyre.

Accordingly, the subject of the invention is an assembly of a tyre and a member fitted to the tyre, the tyre and the member comprising respectively complementary connecting portions, the connecting portion of the member being more flexible than the connecting portion of the tyre.

By virtue of the invention, the behaviour of the tyre when it deforms is not disrupted by the presence of the member on its surface since the member is capable of deforming itself at least as much as the tyre. Therefore, the member does not create a zone of concentration of forces, which is usually the cause of the peeling of the member or of a damaging of the surface of the tyre. The grip of the member on the tyre is therefore improved.

An assembly according to the invention may also comprise one or more of the following features.

- The modulus of lengthening at 10% of the connecting portion of the member is at most equal to the modulus of lengthening at 10% of the connecting portion of the tyre.
- The ratio between the modulus of lengthening at 10% of the connecting portion of the member and the modulus of lengthening at 10% of the connecting portion of the tyre is at most equal to 1 in a wide range of operating temperatures of the tyre.
- The range of operating temperature goes from 0 to 80 degrees Celsius.
- The connecting portion of the tyre is formed by an inner rubber of the tyre.
- The connecting portion of the member is made of rubber, the rubber being natural or synthetic.
- The member comprises a holding portion for a device that is notably electronic.
- The assembly comprises a layer of connecting material inserted between the connecting portions, the layer being set back from or flush with the peripheral edge of the connecting portion of the member. This layer of connecting material comprises for example natural rubber. When the connecting layer is in contact with the air, it oxidizes, which causes damage to the surface of the tyre. By covering the connecting layer with the connecting portion of the member, it is not in direct contact with the air. Therefore, the oxidation of the connecting layer is reduced, which prolongs the service life of the assembly of the member to the tyre.
- The peripheral edge of the member is delimited by the joining line of opposite surfaces converging on their joining line at an angle of between 9 and 15°, preferably between 10° and 12°. The angle of the borders of the member is an important parameter to be taken into consideration so that the attachment of the member to the tyre is durable. Specifically, if this angle is less than 9°, a crimping of the borders appears, causing, at the time of installation, a risk of folds which appear on the peripheral border of the member and which are difficult to flatten correctly. If this angle is greater than 15 degrees, the peripheral edge of the member is too rigid so that it creates stresses that are too great on the surface of the tyre and causes cracks or peeling when running.
- The member comprises a mass of rubber delimited by two opposite surfaces that are substantially parallel respectively forming a supporting surface and a connecting surface with a tyre, the mass comprising an opening arranged in the connecting surface delimiting a recess arranged in the mass, the supporting surface extending at least partially in line with the surface of the opening. By being in contact with the connecting surface, the device stiffens the mass and more particularly the portion of the mass that is situated in line with the connecting surface. Because of the recess, a portion of the mass of rubber stiffened by the device is not in contact with the tyre. Therefore, the device situated on the supporting surface or the portion of the device situated in line with the surface of the opening has no direct mechanical influence on the tyre. The result of this is that the recess of the member of the invention improves the mechanical decoupling between the device and the tyre.

The invention will be better understood on reading the following description given only as an example and made with reference to the appended drawings in which:

FIG. 2 is a view in section of the member of FIG. 1 on the plane II-II of FIG. 1, and FIG. 3 is a view in section of the member of FIG. 1 when it is fitted to a tyre and it holds a device.

Figure 1:
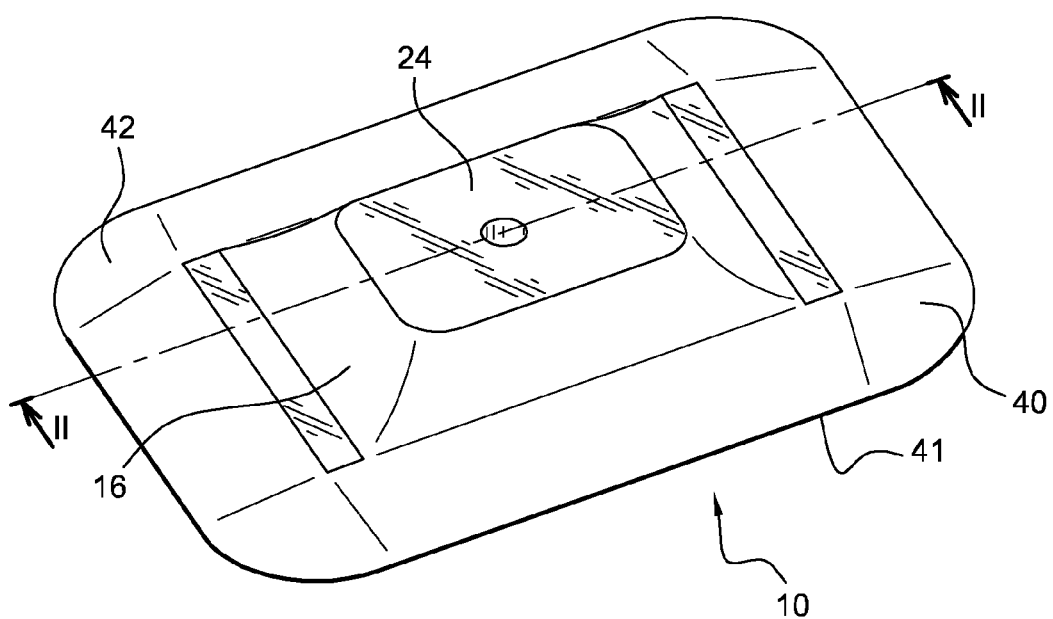
FIG. 1 is a view in perspective of a member of an assembly according to the invention.

"Modulus of elasticity" of a rubber or rubbery mixture is understood to be a secant modulus of extension at 10% of deformation and at ambient temperature or specified temperature; the measurement is taken after a first cycle of accommodation up to 10% of deformation:

$$-E_{10} = \frac{F_{10}}{S \times \varepsilon_{10}} \text{ i.e. } E_{10} = \frac{F_{10}(1+\varepsilon_{10})}{S_0 \times \varepsilon_{10}} \text{ and } E_{10} = \frac{F_{10} \times 1.1}{S_0 \times 0.1}$$

in which $\varepsilon_{10}$ is equal to 0.1;

where $E_{10}$: secant modulus of extension at 10% of deformation; $F_{10}$: force of extension at 10% of extension; $S_0$: initial section of the test specimen; S: section of the test specimen at the deformation of extension $\varepsilon$, in the case of rubber material, it is known that:

$$S = \frac{S_0}{1+\varepsilon};$$

and $\varepsilon_{10}$ deformation of extension at 10%.

The figures $\varepsilon_{10}$ show an example of a member according to the invention suitable for a passenger vehicle. The member is designated by the general reference number 10 and is designed to be fitted to a tyre 12 and to form a support for a device 14. This device 14 may be of various types, for example electronic (pressure sensor, temperature sensor, etc.), mechanical or other type.

The member 10 comprises a mass 16 of rubber which, as shown in FIG. 3, comprises a portion 18 for supporting the member 14 and a portion 20 for connecting with the tyre 12. The portions 18 and 20 are made in one piece and their separation is imaginary. The mass 16 of rubber is obtained by moulding.

The member 10 is designed to be fitted on a surface preferably inside the tyre. In FIG. 3, the member 10 is fitted to an internal sealing rubber 22 of the tyre 12. The internal rubber 22 forms a complementary portion for connecting the connecting portion 20 of the member 10.

The mass 16 of rubber is delimited by a surface 24 for supporting the member 14, the surface 24 being constituted by the upper surface of the supporting portion 18. The dimensions of the supporting surface 24 are approximately 15 millimeters×12 millimeters (mm). The device 14 carried by the supporting surface can have dimensions greater than those of the supporting surface 24 as shown in FIG. 3.

The mass 16 of rubber is also delimited by a surface 26 for connecting with the tyre 12, opposite to the supporting surface 24 and substantially parallel to the latter. The connecting surface 26 is constituted by the lower surface of the connecting portion 20 of the member 10. The dimensions of the connecting surface 26 are approximately 40 mm×32 mm.

The two surfaces 24 and 26 are substantially flat and are approximately 4 mm apart from one another.

The member 10 comprises an opening 28 arranged in the connecting surface 26 and delimiting a recess 30 arranged in the mass 16. The opening 28 is represented in dashed line in FIG. 2. The depth of the recess 30 is approximately 1.5 mm.

It will be noted that, because of the presence of the recess 30 in the mass 16, there is at least one imaginary sectional plane of the mass 16 substantially parallel to the opposite surfaces 24 and 26 in which the section of the mass 16 has a generally annular shape.

The mass 16 is formed so that the supporting surface 24 extends at least partially in line with the surface of the opening 28. In other words, the orthogonal projection of the surface 24 onto the connecting surface 26 delimits the surface of the opening 28.

In the example shown in FIG. 2, the orthogonal projection of the supporting surface 24 onto the connecting surface 26, symbolized by projection lines 36, coincides substantially with the opening 28.

Because of the recess 30, the portion of the mass 16 that is situated in line with the connecting surface 24 and which is therefore made rigid by the presence of the device 14, is not in contact with the internal rubber 22 of the tyre 12.

The supporting portion 18 is connected to the connecting portion 20 by bridges of material 38 connected to the periphery of the supporting portion 18. These bridges of material 38 are not very thick, for example 4 mm thick, so they are flexible and they allow a relative movement of the two portions 18 and 20, notably in the case of deformations of the tyre 12 or vibrations of the device 14. This makes it possible to further enhance the mechanical decoupling between the tyre 12 and the device 14.

The mass of rubber optionally also comprises a channel 32 that is arranged in the supporting portion 18 of the mass 16 and that leads on one side to the supporting surface 24 and on the other side to the bottom of the recess 30. This channel makes it possible to correctly position the device 14 on the supporting surface 24. It also makes it easier to stick the member 10 to the tyre while avoiding trapping air in the recess 30. Finally, it allows a fluidic communication between the recess 30 and the air inside the tyre by cooperating with a similar channel arranged in the device. Therefore, variations in pressure or in temperature of the tyre do not cause pressure differences between the inside of the tyre and the inside of the recess which differences are sources of deformations of the member.

The rubber used for producing the connecting portion 20 of the mass 16 is a rubber the modulus of extension of which, at 10%, is at most equal to that of the tyre 12. In other words, the connecting portion 20 is more flexible than the internal rubber 22. As an example, for a modulus of extension at 10% of the internal rubber 22 of the tyre equal to 2.2 MPa at 65° C., to manufacture the member 10, a rubber should be chosen having a modulus of extension at most equal to 2.2 MPa at 65° C. For good endurance of the assembly, the modulus of the rubber of the member should comply with this limit value throughout the whole temperature range of the tyre when running, for example between 0 and 80 degrees Celsius. The rubber used may be natural or synthetic.

The connecting portion 20 of the member 10 comprises a peripheral edge 40 delimited by the joining line 41 between the connecting surface 26 and an upper surface 42 of the connecting portion 20. For manufacturing purposes, and notably to make venting easier during moulding, the joining line 41 can be of a thickness different from zero but can be very thin, of the order of 0.1 to 0.2 mm. In this case, it is then called the joining surface 41. The two surfaces 26 and 42 converge on the joining line 41 and, between them, close to the line 41, form an angle α of between 9 and 15°, preferably between 10 and 12°.

As shown in FIG. 3, the member 10 is secured to the tyre 12 by means of a connecting material 44, inserted between the connecting surface 26 of the member 10 and the internal rubber 22. This connecting layer 44 extends over the whole length of the connecting surface 26 but does not protrude. In other words, the connecting layer 44 is flush with the peripheral edge 41.

Preferably, the angle α between the two surfaces 26 and is between 10 and 12 degrees in a zone of the peripheral edge 40 that extends up to a distance d of approximately 7 mm from the joining line 41.

Figure 4:
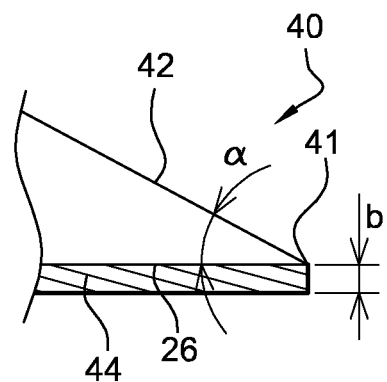
FIGS. 4 to 6 are enlarged views in section of several embodiments of a peripheral edge of a member.
Figure 5:
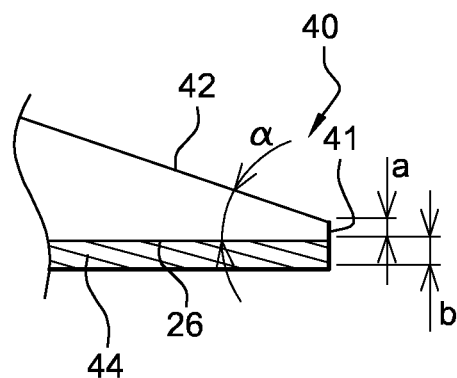
Figure 6:
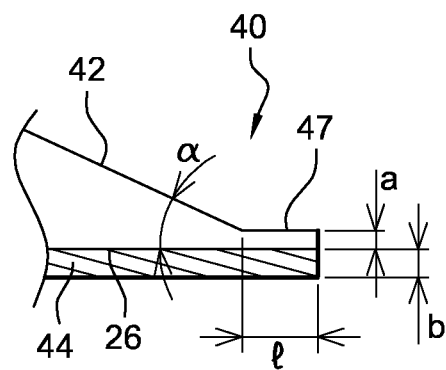

FIGS. 4 to 6 show in section enlargements of three embodiments of the peripheral edge 40.

In FIG. 4, the two surfaces 26 and 42 join to form a joining line 41, that is to say a joining surface 41 of zero thickness.

In FIG. 5, the peripheral edge 40 is delimited by a joining surface 41 that is normal to the surface 26 and has a thickness a of the order of 0.1 to 0.2 mm.

In FIG. 6, the peripheral edge 40 comprises a cord 47 that has a rectangular section and that extends over a distance l of between 0 (as in FIG. 5) and approximately 1.5 mm.

The presence of this cord 47 and of the joining surface 41 make it easier to vent the moulds for manufacturing the members. It is also possible to use vents for example in other locations and maintain a geometry as illustrated in FIG. 4.

FIGS. 4 to 6 also show the layer 44 of connecting rubber placed against the connecting surface 26, with a thickness b of the order of 0.3 mm. This layer of connecting rubber ends at the peripheral edge without going beyond the cord or the surface or the joining line.

Finally, the invention is not limited to the example described above since it is possible, for example, to use all geometries for the supporting portions of the device, no recess in the mass 16 or a plurality of recesses in the mass 16.

The invention claimed is:

1. An assembly comprising:
   a tyre that includes a tyre connecting portion; and
   a member formed of a mass of rubber, the member including a member connecting portion and a member supporting portion, the rubber of the member connecting portion being integral with and same as the rubber of the member supporting portion, the member connecting portion being formed together with the member supporting portion as a one-piece structure, and the member connecting portion being positioned facing the tyre connecting portion, wherein the member supporting portion is arranged to support an electronic device directly thereon;

wherein the member is attached to the tyre via the member connecting portion and the tyre connecting portion, wherein a modulus of lengthening at 10% of the member connecting portion is at most equal to a modulus of lengthening at 10% of the tyre connecting portion, wherein the mass of rubber of the member is delimited by two opposite surfaces that are substantially parallel, the two opposite surfaces respectively forming a supporting surface for supporting the electronic device and a connecting surface for connecting with the tyre, wherein the mass of rubber of the member includes an opening arranged in the connecting surface delimiting a recess having a closed outer perimeter arranged in the mass of rubber, and wherein an orthogonal projection of the supporting surface on to the connecting surface coincides substantially with the opening.

2. An assembly according to claim 1, wherein a ratio between the modulus of lengthening at 10% of the member connecting portion and the modulus of lengthening at 10% of the tyre connecting portion is at most equal to 1 in a range of operating temperatures of the tyre.

3. An assembly according to claim 2, wherein the range of operating temperature is from 0 to 80 degrees Celsius.

4. An assembly according to claim 1, wherein the tyre connecting portion is formed by an inner rubber of the tyre.

5. An assembly according to claim 1, wherein the member connecting portion is made of synthetic rubber or natural rubber.

6. An assembly according to claim 1, further comprising a layer of connecting material located between the member connecting portion and the tyre connecting portion, a periphery of the layer being set back from or flush with a peripheral edge of the member connecting portion.

7. An assembly according to claim 6, wherein the layer of connecting material includes natural rubber.

8. An assembly according to claim 1, wherein a peripheral edge of the member is delimited by joining lines of opposite surfaces converging at an angle of between 9 and 15 degrees.

9. An assembly according to claim 8, wherein the angle is between 10 and 12 degrees.

10. An assembly comprising:
a tyre that includes a tyre connecting portion; and
a member formed of a mass of rubber, the member including a member connecting portion and a member supporting portion, the rubber of the member connecting portion being integral with and same as the rubber of the member supporting portion, the member connecting portion being formed together with the member supporting portion as a one-piece structure, and the member connecting portion being positioned facing the tyre connecting portion, wherein the member supporting portion is arranged to support an electronic device directly thereon, wherein the member is attached to the tyre via the member connecting portion and the tyre connecting portion, and wherein a modulus of lengthening at 10% of the member connecting portion is at most equal to a modulus of lengthening at 10% of the tyre connecting portion;

wherein the mass of rubber of the member is delimited by two opposite surfaces that are substantially parallel, the two opposite surfaces respectively forming a supporting surface for supporting a device and a connecting surface for connecting with the tyre, wherein the mass of rubber of the member includes an opening arranged in the connecting surface delimiting a recess having a closed outer perimeter arranged in the mass of rubber, wherein the supporting surface extends at least partially in line with a surface of the opening, and wherein a peripheral edge of the member is delimited by joining lines of opposite surfaces converging at an angle of between 10 and 12 degrees.

11. An assembly according to claim 10, wherein a ratio between the modulus of lengthening at 10% of the member connecting portion and the modulus of lengthening at 10% of the tyre connecting portion is at most equal to 1 in a range of operating temperatures of the tyre.

12. An assembly according to claim 11, wherein the range of operating temperatures is from 0 to 80 degrees Celsius.

13. An assembly according to claim 10, wherein the tyre connecting portion is formed by an inner rubber of the tyre.

14. An assembly according to claim 10, wherein the member connecting portion is made of synthetic rubber or natural rubber.

15. An assembly according to claim 10, further comprising a layer of connecting material located between the member connecting portion and the tyre connecting portion, a periphery of the layer being set back from or flush with a peripheral edge of the member connecting portion.

16. An assembly according to claim 15, wherein the layer of connecting material includes natural rubber.

* * * * *

UNITED STATES PATENT AND TRADEMARK OFFICE
CERTIFICATE OF CORRECTION

| | | |
|---|---|---|
| PATENT NO. | : 8,672,003 B2 | Page 1 of 1 |
| APPLICATION NO. | : 12/738334 | |
| DATED | : March 18, 2014 | |
| INVENTOR(S) | : Claudio Battocchio et al. | |

It is certified that error appears in the above-identified patent and that said Letters Patent is hereby corrected as shown below:

In the Specification:

<u>COLUMN 4</u>

Line 35, "26 and" should read --26 and 42--.

Signed and Sealed this
Eighth Day of July, 2014

Michelle K. Lee
*Deputy Director of the United States Patent and Trademark Office*